2,844,459
METHOD FOR THE PRODUCTION OF CADMIUM

James L. Wyatt, South Euclid, Ohio, assignor to Horizons Incorporated, Princeton, N. J., a corporation of New Jersey No Drawing. Application February 17, 1956
Serial No. 566,100

8 Claims. (Cl. 75—71)

This invention relates to a process for producing metallic cadmium.

More particularly it relates to a process in which a suitable reducing agent reduces a cadmium compound in a fused salt environment.

Metallic cadmium is commonly obtained as a by-product in the manufacture of zinc. In the principal process employed for the recovery of zinc, zinc ores and residues are reduced to the metallic state by carbonaceous reducing agents. Any cadmium present in the ore is reduced at the same time as the zinc. Since cadmium is more volatile than zinc it usually is distilled off rapidly in processes in which the zinc is removed as a volatile product. The other main approach has been an electrolytic purification in which the zinc-cadmium ore or residue is dissolved in a suitable acid and electrolyzed.

In accordance with my invention, pure cadmium metal is produced by reduction of any compound of cadmium capable of yielding the oxide when heated to somewhat elevated temperatures. The reduction is carried out in a fused salt bath whereby many operational advantages are achieved and many of the disadvantages in the prior art processes for reducing cadmium-containing zinc ores or residues are avoided. In the process about to be described reduction and distillation of the cadmium occur simultaneously. Briefly, the method consists of introducing a carbonaceous reducing agent, preferably in gaseous form, into a fused salt melt in which cadmium oxide or any other appropriate reducible compound is dissolved or dispersed.

The fused salt medium selected should be relatively inert to the cadmium-containing materials and should, if possible, serve to flux any impurities present in the raw materials. To attain any desired operating temperature range suitable, bath compositions may be prepared from the alkali metal halide and alkaline earth metal halides either singly or in admixture in appropriate proportions. The use of fluoride baths requires the use of apparatus resistant to attack by such materials while the use of bromides or iodides merely serves to increase the expense of the process without producing any accompanying advantages. Accordingly, I prefer to employ as the fused salt melt one or more chlorides of the alkali or alkaline earth metals and because it offers melts below my preferred operating temperatures, it is preferred to employ a potassium chloride-sodium chloride eutectic.

A distinction should be noted between the fused melts proposed as the media in which reduction of the cadmium compound is achieved and molten slags. My melts are thin liquids and very fluid at the temperatures at which my process is conducted. Most metallurgical slags, particularly silicate slags are relatively thick and pasty as compared to the chloride melts I prefer. Because they are thin and highly fluid, the melts permit the cadmium vapor to escape as rapidly as it is formed.

Cadmium-containing materials which may be processed in accordance with this invention are the oxide, carbonate, nitrate or sulfate or cadmium-containing residues obtained from various pyrometallurgical operations. In order to facilitate the reduction of this material it should be prepared in finely divided form, preferably —325 mesh (Tyler Standard) by conventional comminuting techniques.

The reducing agents which may be employed include carbon monoxide, finely divided carbon suspended in carbon monoxide or any other suitable carrier gas, and any other reducing gas. It has also been found advantageous to suspend a small amount of finely divided carbon in the melt to assist in maintaining reducing conditions therein.

The following specific example illustrates more fully the practice of this invention but is not intended to limit the same:

Example 1

Fifty grams of cadmium oxide (technical grade powdered), six grams of carbon (lampblack), and 200 grams of KCl—NaCl (eutectic) were mixed together, placed in a Vycor tube, and heated to fusion in a core-wound furnace. A cover provided with a connection for an inlet tube and another connection to a condenser, was placed on the Vycor tube. Carbon monoxide was sparged into the melt through an inlet tube dipping into the melt at a flow rate of 5 cu. ft. per hour. The temperature was then raised to 850° C. and cadmium metal was distilled into the condenser as it formed. The condenser and the connections leading to it were heated to 400° C. After two hours of sparging carbon monoxide into the bath, an argon atmosphere was introduced into the condenser to prevent the metal from oxidizing, and the carbon monoxide was turned off.

The product trapped in the condenser was in two forms (powdered and cake). The weight of the recovered metal was 27.8 grams. The recovered metal was found to be unusually pure, having the following spectrochemical analysis:

| | | |
|---|---|---|
| Cd | | Major |
| Si | Less than | 0.001 |
| Fe | | 0.007 |
| Mg | Less than | 0.001 |
| Pb | Less than | 0.001 |
| Al | | 0.001 |
| Cu | Less than | 0.0005 |
| Na | | 0.05 |
| Ti | Less than | 0.001 |

Sb, As, B, P, Tl, Mn, Sn, Bi, Mo, V, Zn, Ni, Ca, and Co were not found.

In the foregoing example, a bath melting at about 660° C. was used. It is possible to operate at any temperature in the range between the melting point of cadmium and 950° C., but I prefer temperatures between 675° C. and 900° C. Although cadmium does not boil below 778° C. (at one atmosphere), it nevertheless has an appreciable vapor pressure at temperatures upwards of 650° C.

When operating with a fused NaCl—KCl eutectic melt, it has been found that impurities fluxed by the bath and collected therein do not materially interfere with the process, and that the bath may be held in molten form for long periods of time without undue corrosive attack on the refractory container and other apparatus in the system.

While I have described a preferred embodiment of my process, in which cadmium oxide is the reducible compound, it will be apparent to those skilled in the art that the procedure disclosed may be adapted to the treatment of other cadmium-containing materials including flue dusts, roaster residues, and even secondary cadmium metal.

I claim:
1. A process for producing metallic cadmium which comprises: forming a fused melt consisting of at least one salt from the group consisting of alkali metal halides and alkaline earth metal halides; introducing a reducible cadmium compound into the melt; maintaining the melt and the reducible compound at a temperature at which cadmium metal has an appreciable vapor pressure; introducing a reducing agent into said melt, thereby effecting simultaneous reduction and distillation of the cadmium, separating the cadmium metal from the melt as a vapor and recovering the cadmium so produced.

2. A process for producing metallic cadmium which comprises: forming a fused melt consisting of a mixture of sodium chloride and potassium chloride; introducing a reducible cadmium compound into said melt; maintaining the melt at a temperature between 650° C. and 950° C. while introducing a reducing gas into the melt, whereby the cadmium compound is reduced and the resulting cadmium metal is distilled simultaneously with the reduction of the cadmium compound, separating the cadmium metal from the melt as a vapor and recovering the cadmium.

3. A process for producing metallic cadmium which comprises: forming a fused melt consisting of a mixture of sodium chloride and potassium chloride; introducing a reducible cadmium oxide into said melt; maintaining the melt at about 850° C. while introducing carbon monoxide into the melt, whereby the cadmium oxide is reduced to cadmium metal, which is distilled from the melt as it is formed by reduction of the cadmium oxide; separating the cadmium metal from the melt as a vapor and recovering the cadmium so produced.

4. The process of claim 3 in which the fused melt is a eutectic mixture of KCl and NaCl.

5. A process for producing metallic cadmium which comprises: melting a charge mixture of a reducible cadmium compound and at least one salt from the group consisting of alkali metal halides and alkaline earth metal halides, introducing a reducing gas into said melt, thereby simultaneously reducing and distilling the cadmium from the melt, and recovering the metallic cadmium so produced, as a vapor distilled from the melt.

6. The process of claim 5 in which a small amount of carbon is included in the charge mixture.

7. The process of claim 5 in which the charge includes sodium chloride and potassium chloride.

8. The process of claim 5 in which the reducing gas is carbon monoxide and the reducible compound is an oxide of cadmium.

References Cited in the file of this patent

UNITED STATES PATENTS

| | | |
|---|---|---|
| 1,246,576 | Fiske | Nov. 13, 1917 |
| 1,691,714 | Gerlach et al. | Nov. 13, 1928 |
| 1,779,862 | Teter | Oct. 28, 1930 |
| 1,785,139 | Monroe | Dec. 16, 1930 |
| 2,178,763 | O'Brien | Nov. 7, 1939 |